US 8,259,940 B2

(12) United States Patent
Beun et al.

(10) Patent No.: US 8,259,940 B2
(45) Date of Patent: Sep. 4, 2012

(54) METHOD FOR BROADCASTING DIGITAL DATA TO A TARGETED SET OF RECEPTION TERMINALS

(75) Inventors: Frédéric Beun, Chatou (FR); Laurence Boudier, Chatou (FR); Pierre Roque, Paris (FR); Bruno Tronel, Puteaux (FR)

(73) Assignee: Viaccess, Paris la Defense Cedex (FR)

( * ) Notice: Subject to any disclaimer, the term of this patent is extended or adjusted under 35 U.S.C. 154(b) by 858 days.

(21) Appl. No.: 11/597,536

(22) PCT Filed: May 24, 2005

(86) PCT No.: PCT/FR2005/050358
§ 371 (c)(1),
(2), (4) Date: Nov. 22, 2006

(87) PCT Pub. No.: WO2005/120066
PCT Pub. Date: Dec. 15, 2005

(65) Prior Publication Data
US 2007/0223695 A1 Sep. 27, 2007

(30) Foreign Application Priority Data
May 28, 2004 (FR) ..................... 04 51064

(51) Int. Cl.
*H04N 7/167* (2011.01)
(52) U.S. Cl. ........ 380/239; 380/200; 380/228; 380/229; 380/261; 380/37; 713/500; 713/161; 725/117
(58) Field of Classification Search .......... 380/267–268, 380/200–239; 726/30; 713/500
See application file for complete search history.

(56) References Cited

U.S. PATENT DOCUMENTS

| 5,301,233 | A | | 4/1994 | Coutrot et al. .................. 380/23 |
|---|---|---|---|---|
| 5,870,474 | A | * | 2/1999 | Wasilewski et al. .......... 380/211 |
| 6,061,451 | A | | 5/2000 | Muratani et al. .............. 380/201 |
| 6,587,561 | B1 | | 7/2003 | Sered et al. ................... 380/241 |
| 6,826,103 | B2 | * | 11/2004 | Moon et al. .............. 365/185.21 |
| 6,898,285 | B1 | * | 5/2005 | Hutchings et al. ............ 380/200 |
| 7,039,938 | B2 | * | 5/2006 | Candelore ....................... 725/87 |
| 7,203,314 | B1 | * | 4/2007 | Kahn et al. .................... 380/239 |

(Continued)

FOREIGN PATENT DOCUMENTS
EP   0471373 A2   2/1992
(Continued)

OTHER PUBLICATIONS

Hun-Chen Chen, New Cryptography system and its VLSI realization, Oct. 21, 2002, Journal of System Architecture, vol. 49, pp. 8-12.*

(Continued)

*Primary Examiner* — Nathan Flynn
*Assistant Examiner* — Viral Lakhia
(74) *Attorney, Agent, or Firm* — Nixon Peabody LLP

(57) ABSTRACT

This invention relates to a method for broadcasting digital data to a targeted set of reception terminals in which said data are previously scrambled by a series of control words transmitted in a conditional access control message.
This method comprises the following steps:
on transmission,
particularise said access control message using a reversible function F for which the inverse function $F^{-1}$ is executable only in terminals in the targeted set,
and on reception,
redetermine the original access control message in each terminal in the targeted set using said inverse function.

16 Claims, 6 Drawing Sheets

U.S. PATENT DOCUMENTS

| | | | |
|---|---|---|---|
| 7,333,610 B2* | 2/2008 | Dallard et al. | 380/239 |
| 7,356,147 B2* | 4/2008 | Foster et al. | 380/281 |
| 7,397,918 B2* | 7/2008 | Patinkin et al. | 380/200 |
| 7,409,562 B2* | 8/2008 | Kahn et al. | 713/194 |
| 7,647,641 B2* | 1/2010 | Dubroeucq et al. | 726/27 |
| 7,730,300 B2* | 6/2010 | Candelore | 713/155 |
| 7,949,133 B2* | 5/2011 | Pinder | 380/218 |
| 7,995,603 B2* | 8/2011 | Revital et al. | 370/432 |
| 2001/0042203 A1 | 11/2001 | Watchfogel et al. | 713/161 |
| 2001/0046299 A1* | 11/2001 | Wasilewski et al. | 380/282 |
| 2001/0050990 A1* | 12/2001 | Sudia | 380/286 |
| 2003/0046686 A1* | 3/2003 | Candelore et al. | 725/31 |
| 2003/0061477 A1* | 3/2003 | Kahn et al. | 713/150 |
| 2003/0158814 A1* | 8/2003 | Cochard et al. | 705/50 |
| 2003/0200444 A1* | 10/2003 | Sasselli | 713/182 |
| 2004/0102155 A1* | 5/2004 | Klauss et al. | 455/3.01 |
| 2004/0151314 A1* | 8/2004 | Candelore | 380/239 |
| 2004/0151315 A1* | 8/2004 | Kim | 380/241 |
| 2005/0198679 A1* | 9/2005 | Baran et al. | 725/88 |
| 2005/0238170 A1* | 10/2005 | Ksontini et al. | 380/268 |
| 2006/0059508 A1* | 3/2006 | Kamperman et al. | 725/31 |

FOREIGN PATENT DOCUMENTS

| | | |
|---|---|---|
| EP | 0822719 A2 | 2/1998 |
| EP | 1353511 A2 | 10/2003 |
| WO | WO 9909743 | 2/1999 |

OTHER PUBLICATIONS

International Search Report, PCT/FR2005/050358, 2 pgs., (Sep. 28, 2005).

Guillou, Louis Claude et al. "Encipherment and Conditional Access", SMPTE Journal, SMPTE Inc. Scarsdale, N.Y., US, vol. 103, No. 6, (Jun. 1, 1994), pp. 398-406, XP000457575, ISSN: 0036-1682.

Sath*ck: Satforum. CZ, Online!, (Jul. 26, 2002), XP002309749, Retrieved from the Internet: URL:http://ww.satforum.cz/showthread.php?t=305> 'retrieved on Dec. 11, 2004!.

* cited by examiner

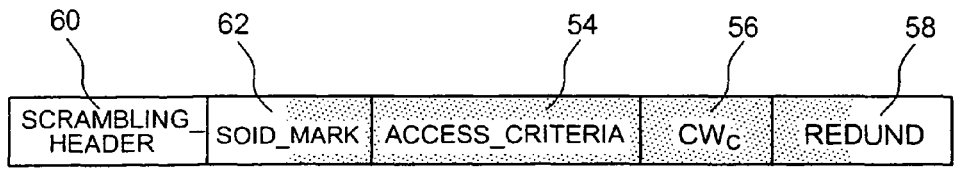

FIG. 5

| Initial Structure | ⟹ | Transformed structure |

| $T_{Operator\_Id}$ = 0x90 (1 byte) |
| $L_{Operator\_Id}$ = 0x03 (1 byte) |
| Operator_Id = 0xaa....ab (3 bytes) Identifier + Key |
| $T_{Subscription}$ = 0xE1 (1 byte) |
| $L_{Subscription}$ = 0x04 (1 byte) |
| Subscription = 0xbb....bb (4 bytes) Date + Theme + Level |
| $T_{ECWOCW}$ = 0xEA (1 byte) |
| $L_{ECWOCW}$ = 0x10 (1 byte) |
| ECWOCW = 0xcc...cc (16 bytes) ECW and OCW cryptograms |
| $T_{Hash}$ = 0xF0 (1 byte) |
| $L_{Hash}$ = 0x08 (1 byte) |
| Hash = 0xdd.....dd (8 bytes) Cryptographic redundancy |

| $L_{Operator\_Id}$ = 0x03 (1 byte) |
| $L_{Subscription}$ = 0x04 (1 byte) |
| $L_{ECWOCW}$ = 0x10 (1 byte) |
| $L_{Hash}$ = 0x08 (1 byte) |
| $T_{Operator\_Id}$ = 0x90 (1 byte) |
| $T_{Subscription}$ = 0xE1 (1 byte) |
| $T_{ECWOCW}$ = 0xEA (1 byte) |
| $T_{Hash}$ = 0xF0 (1 byte) |
| Operator_Id = 0xaa....ak (3 bytes) Identifier + Key |
| Subscription = 0xbb....bb (4 bytes) Date + Theme + Level |
| ECWOCW = 0xcc...cc (16 bytes) ECW and OCW cryptograms |
| Hash = 0xdd.....dd (8 bytes) Cryptographic redundancy |

FIG. 7

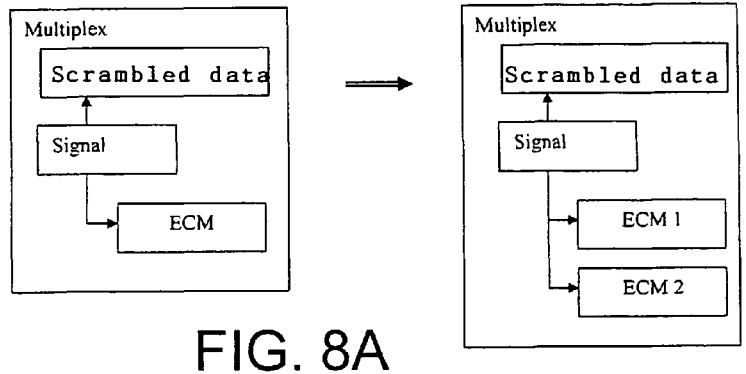

FIG. 8A

Initial ECM message ⟹ ECM message 1

| | |
|---|---|
| $T_{Operator\_Id}$ = 0x90 (1 byte) | |
| $L_{Operator\_Id}$ = 0x03 (1 byte) | |
| Operator_Id = 0xaa....ab (3 bytes) Identifier + Key | |
| $T_{Subscription}$ = 0xE1 (1 byte) | |
| $L_{Subscription}$ = 0x04 (1 byte) | |
| Subscription = 0xbb....bb (4 bytes) Date + Theme + Level | |
| $T_{ECWOCW}$ = 0xEA (1 byte) | |
| $L_{ECWOCW}$ = 0x10 (1 byte) | |
| ECWOCW = 0xcc...cc (16 bytes) ECW and OCW cryptograms | |
| $T_{Hash}$ = 0xF0 (1 byte) | |
| $L_{Hash}$ = 0x08 (1 byte) | |
| Hash = 0xdd .....dd (8 bytes) Cryptographic redundancy | |

| |
|---|
| $T_{Operator\_Id}$ = 0x90 (1 byte) |
| $L_{Operator\_Id}$ = 0x03 (1 byte) |
| Operator_Id = 0xaa....ab (3 bytes) Identifier + Key |
| $T_{Subscription}$ = 0xE1 (1 byte) |
| $L_{Subscription}$ = 0x04 (1 byte) |
| Subscription = 0xbb....bb (4 bytes) Date + Theme + Level |
| $T_{ECWOCW}$ = 0xEA (1 byte) |
| $L_{ECWOCW}$ = 0x10 (1 byte) |
| ECWOCW = 0xcc... (8 bytes) First 8 bytes |

ECM message 2

| |
|---|
| ECWOCW = 0x.......cc (8 bytes) Last 8 bytes |
| $T_{Hash}$ = 0xF0 (1 byte) |
| $L_{Hash}$ = 0x08 (1 byte) |
| Hash = 0xdd .....dd (8 bytes) Cryptographic redundancy |

FIG. 8B

METHOD FOR BROADCASTING DIGITAL DATA TO A TARGETED SET OF RECEPTION TERMINALS

CROSS REFERENCE TO RELATED APPLICATIONS or PRIORITY CLAIM

This application is a national phase of International Application No. PCT/FR2005/050358 entitled "Method For Transmission Of Digital Data To A Group Of Target Receiver Terminals", which was filed on May 24, 2005, which was not published in English, and which claims priority of the French Patent Application No. 04 51064 filed May 28, 2004.

TECHNICAL DOMAIN

The invention relates to the field of access control to broadcast digital data and more specifically relates to a method for broadcasting digital data to a targeted set of reception terminals in which said data are previously scrambled by a series of control words transmitted in a conditional access control message.

The invention also relates to a system for broadcasting digital data to a targeted set of reception terminals and a reception terminal capable of receiving these data.

STATE OF PRIOR ART

Access control systems known according to prior art are based essentially on scrambling of the broadcast data and/or services on transmission using secret keys, and descrambling of said data on reception using the same secret keys transmitted in encrypted form to subscribers with access rights.

One disadvantage of these systems is due to the fact that they do not enable an operator to control use of the reception terminals that he rents out. For example, this is the case when the reception terminal supplied by the operator for a given rental period, continues to be used beyond this period. This is also the case when broadcast data are received by stolen terminals. And finally, this is also the case when a terminal rented out by an operator is used to access other broadcast items of data than those of the operator.

Another disadvantage of these systems is due to the fact that they cannot prevent the use of a reception terminal specific to an access control system to access data broadcast using another access control system that diverts signals from the first system.

Another disadvantage according to prior art is due to the fact that they cannot prevent reception of data broadcast by an operator on terminals not authorised by this operator. For example, this is the case when the operator wants to prevent his customers from using freely marketed terminals instead of his own terminals.

One purpose of the invention is to mitigate the inadequacies of access control systems described above.

Another purpose of the invention is to prohibit the reception of data broadcast by terminals not authorised by the operator.

PRESENTATION OF THE INVENTION

The invention recommends a method for broadcasting digital data to a set of reception terminals targeted by the operator, these terminals being either terminals rented out to users or freely marketed terminals authorised to receive data broadcast within the framework of an agreement.

The broadcast data are scrambled on transmission by a sequence of control words transmitted in a conditional access control message.

The method according to the invention comprises the following steps:
on transmission,
particularise the said access control message according to one of the particularisation methods specific to the targeted set of terminals using a reversible function F for which the inverse function $F^{-1}$ is executable only in terminals in the targeted set,
and on reception,
restore the access control message in its original form in each terminal in the targeted set using the said inverse function and the said particularisation methods.

According to one special feature of the invention, the access control message is associated with the description of its methods of particularisation by the reversible function F.

Preferably, the said function F comprises at least one of the following operations:
fully or partially encrypt the access control message as a function of a particularisation parameter specific to the targeted set of terminals;
fully or partially pre-encrypt the control words contained in the access control message as a function of a particularisation parameter specific to the targeted set of terminals;
reversibly transform the structure of said access control message into a structure that can only be recognised by terminals in the targeted set;
reversibly convert the syntax of said access control message into a syntax that can only be recognised by terminals in the targeted set;
breakdown said access control message into several parts in a manner specific to the targeted set of terminals, and transmit said parts separately from each other.

In one particular application of the invention, the broadcast digital data are scrambled audiovisual programs and said access control message is an ECM message.

According to a first variant embodiment, the method according to the invention comprises the following steps:
breakdown the broadcast period into a sequence of crypto-periods CPi,
for each crypto-period Cpi, generate a control word ($Cw_i$),
encrypt said control words,
calculate an ECM message as a function of the encrypted control words obtained in the previous step and as a function of at least one criterion to access the scrambled data,
fully or partially encrypt said ECM message,
broadcast the encrypted ECM message.

According to a second variant embodiment, the method according to the invention comprises the following steps:
breakdown the broadcast duration into a sequence of crypto-periods CPi,
for each crypto-period Cpi, generate a control word ($Cw_i$),
fully or partially pre-encrypt said control words,
encrypt the pre-encrypted control words obtained in the previous step,
calculate an ECM message as a function of the control words obtained in the previous step and as a function of at least one criterion to access to the scrambled data,
broadcast the ECM message.

According to a third variant embodiment, the method according to the invention comprises the following steps:
breakdown the broadcast duration into a sequence of crypto-periods CPi, for each crypto-period Cpi, generate a control word ($Cw_i$),
fully or partially pre-encrypt said control words,
encrypt the pre-encrypted control words,
calculate an ECM message as a function of the control words obtained in the previous step and as a function of at least one criterion to access to the scrambled data,
fully or partially encrypt said ECM message,
broadcast the ECM message.

In the different variant embodiments, the method may also comprise at least one of the following steps before the ECM message is broadcast:
transform the structure of said ECM,
convert the syntax of said ECM,
breakdown said ECM into several parts.

The invention is used in a reception terminal that can receive digital data subject to access conditions transmitted in an access control message previously particularised by a reversible function F.

This terminal comprises a module designed to run the inverse function $F^{-1}$ of said reversible function F to restore said access control message.

This module is preferably software that is either resident or downloaded into the terminal.

BRIEF DESCRIPTION OF THE FIGURES

Other special features and advantages of the invention will become clearer from the following description taken as a non-limitative example with reference to the appended figures, wherein:

FIG. 7 represents a fifth embodiment of the invention,
FIGS. 8a and 8b represent a sixth embodiment of the invention.

DETAILED PRESENTATION OF PARTICULAR EMBODIMENTS

The invention will now be described within the framework of an example application of the method to secure audiovisual programs broadcast by an operator and so as to limit reception of these programs in a specific set of terminals authorised by the operator. Each terminal in the targeted set is provided with a security processor, for example a smart card, and a descrambler.

In the remainder of the description, elements common to the different embodiments will be denoted by identical references.

The broadcast programs are scrambled using secret keys on transmission, and are descrambled on reception using the same secret keys transmitted to subscribers with access rights in encrypted form.

Access rights are transmitted to terminals in an EMM (Entitlement Management Message) and are then memorised in the smart card.

The secret keys are Control Words CW that are transmitted to subscribers in an Entitlement Control Message (ECM) built up from different parameters such as the reference of the cryptographic key associated with the generated message by the operator, the access conditions, the cryptogram of the control words and the cryptographic redundancy. For reasons of clarity, the following description applies to an entitlement control message ECM transporting a single control word CW. However, the invention is equally applicable in the case in which the ECM message transports several control words.

In order to restrict reception of programs to terminals in the targeted set of terminals, the access control message is particularised before transmission using a reversible function F specific to these terminals. When 2 sets of terminals use the same particularisation function, the function dedicated to each of said sets of terminals also comprises a parameter for each of the targeted sets. If the function F is a cryptographic function, this parameter may be a key that is either a secret key in a symmetric or asymmetric cryptographic algorithm, or a public and private pair of keys in an asymmetric cryptographic algorithm.

On reception, only terminals in the targeted set that are capable of running the inverse function $F^{-1}$ will be able to restore the access control message in its original form.

In a first variant embodiment, the said inverse function $F^{-1}$ of the reversible function F is done by software previously installed in each terminal in the targeted set. This software may either be resident or it may be downloaded in each terminal of the targeted set.

In a second variant, the inverse function $F^{-1}$ of function F is done by a dedicated circuit previously installed in each terminal of the targeted set.

Figure 1:
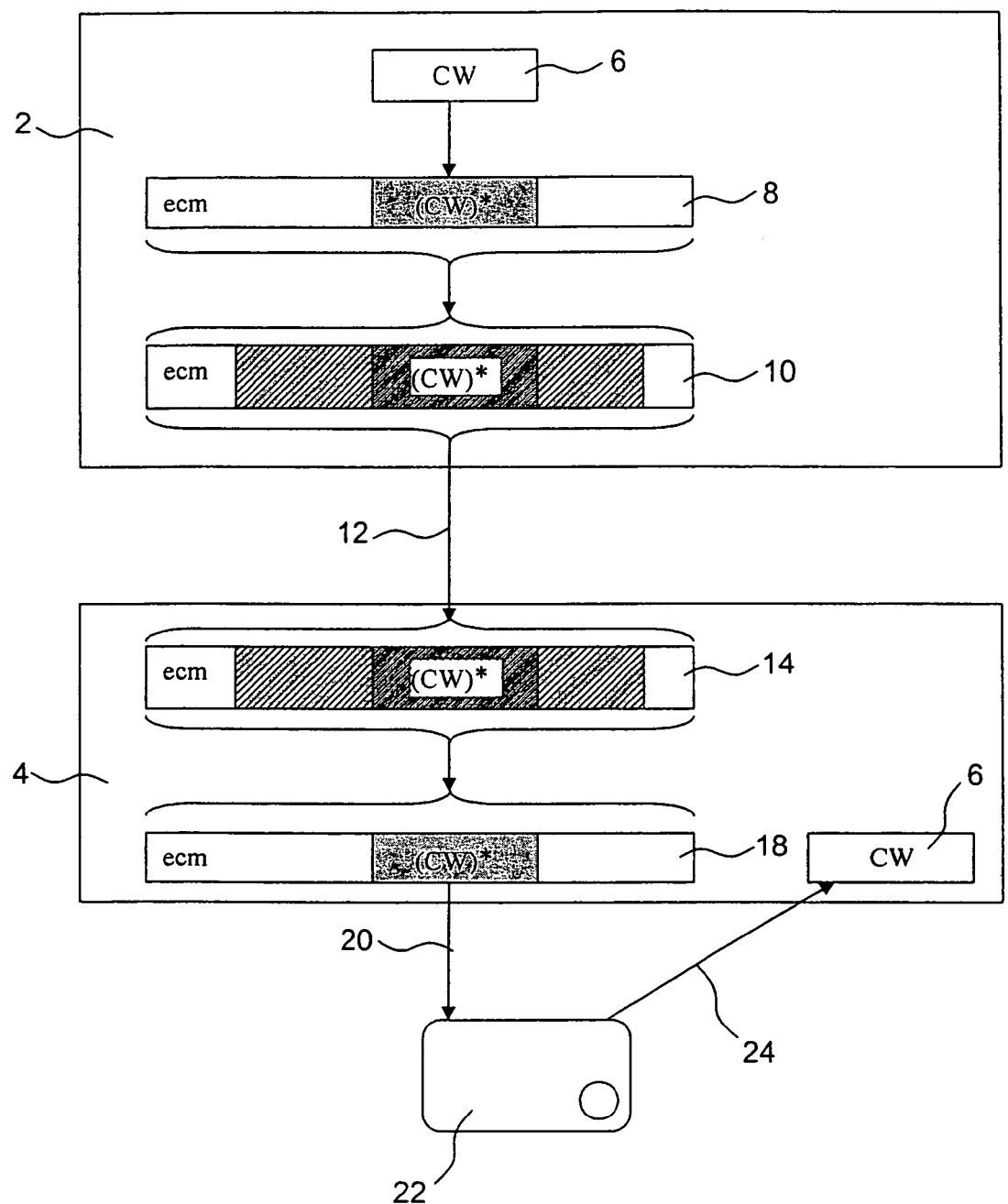
FIG. 1 represents a first embodiment of the invention.

FIG. 1 diagrammatically illustrates a first embodiment of the invention in which the ECM particularisation function F consists of partially or completely encrypting the ECM message.

This embodiment comprises a first ECM particularisation phase 2 and a second phase 4 in which a terminal in the targeted set restores the original ECM.

Phase 2 comprises the following steps:
encrypt the original control word CW 6,
generate the ECM 8 message containing the cryptogram CW* of the original control word CW,
The generated ECM message 8 comprises the reference of the cryptographic key associated with the operator, access conditions, and the cryptogram CW* of the original control word,
partially or fully encrypt the generated ECM message to obtain the encrypted ECM message 10.

The ECM message is encrypted according to methods predefined by the operator and transmitted to or known to each terminal in the targeted set.

The encrypted ECM message 10 is then transmitted (step 12) to the reception terminals.

On reception, the software previously installed in the terminals of the targeted set executes function $F^{-1}$ on the encrypted ECM message 14 received in step 12 to restore the ECM message in its original form 18.

The redetermined ECM message 18 is then transmitted (step 20) to the smart card 22 that decrypts the control word CW and transmits it to the descrambler of the terminal (step 24).

Note that in this embodiment, the control word transmitted by the card to the terminal is in decrypted form. Consequently, and independently of the protection specific to the card/terminal interface, the control word has no extra protection on this interface due to the particularisation function F.

Figure 2:
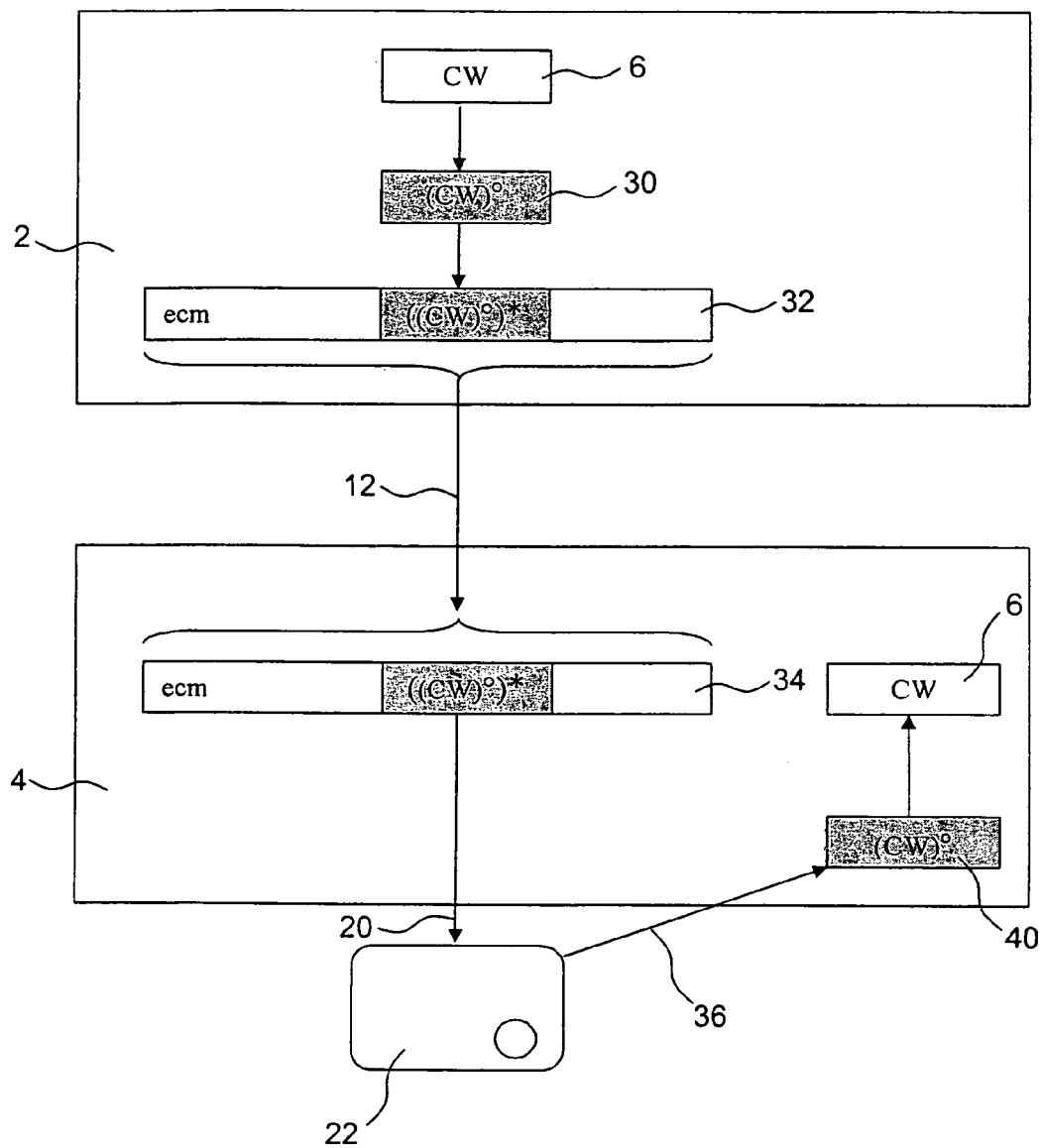
FIG. 2 represents a second embodiment of the invention.

FIG. 2 diagrammatically illustrates a second embodiment in which phase 2 comprises the following steps:
fully or partially pre-encrypt said original control word CW 6,
encrypt the pre-encrypted control word CW 30 before generating the ECM message, generate the ECM message 32 containing the cryptogram $(CW^o)^*$ of the pre-encrypted control word $CW^o$. The generated ECM message 32 contains the reference of the cryptographic key associated by the operator, the access conditions, the cryptogram $(CW^o)^*$ of the pre-encrypted control word $CW^0$ and the cryptographic redundancy. This ECM message is then transmitted (step 12) to the reception terminals.

On reception, the ECM message 34 is transmitted (step 20) to the smart card 22 that decrypts the cryptogram $(CW^o)^*$ and transmits (step 36) the pre-encrypted control word $CW^o$ 40 to the terminal.

The software previously installed in each terminal in the targeted set executes function $F^{-1}$ to redetermine the original control word CW that is then supplied to the descrambler.

In this case, particularisation by function F originates from pre-encryption of the control word CW according to methods predefined by the operator and transmitted to each terminal in the targeted set.

Note that in this embodiment, the control word transmitted by the card to the terminal is in encrypted form. Consequently, and independently of the protection specific to the card/terminal interface, the control word benefits from supplementary protection on this interface by the particularisation function F.

Figure 3:
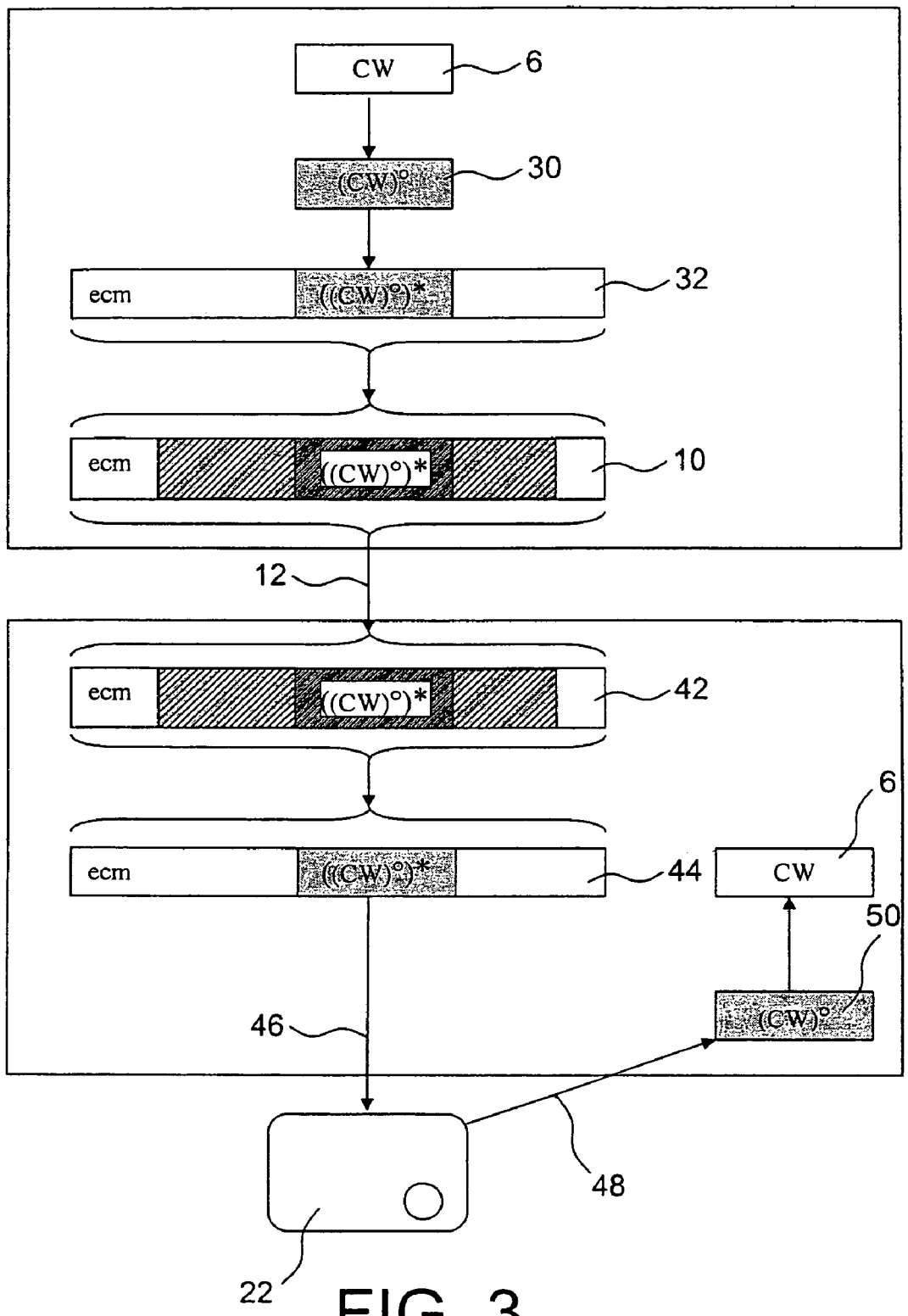
FIG. 3 represents a third embodiment of the invention,
FIGS. 4 and 5 each illustrate the content of an ECM message before particularisation and after particularisation.

FIG. 3 illustrates a third embodiment of the invention resulting from a combination of the first and second embodiments described above.

In this third embodiment, the particularisation phase comprises the following steps:

partially or fully pre-encrypt the original control word CW 6, encrypt the pre-encrypted control word $CW^o$ 30 before generating the ECM message, generate the ECM message 32 containing the cryptogram $(CW^o)^*$ of the pre-encrypted control word $CW^0$ 30, The generated ECM message 32 contains the reference of the cryptographic key associated with the operator generating the message, the access conditions, the cryptogram $(CW^o)^*$ of the pre-encrypted control word $CW^0$ and cryptographic redundancy.

partially or fully encrypt the generated ECM message.

This encrypted ECM message 10 is then transmitted (step 12) to the reception terminals.

On reception, the software previously installed in each terminal in the targeted set executes function $F^{-1}$ to restore the ECM message 44 in its form before particularisation with function F. The redetermined ECM message 44 is then transmitted (step 46) to the smart card 22 that decrypts the cryptogram $(CW^o)^*$ and supplies (step 48) the pre-encrypted control word $CW^0$ 50 to the terminal.

The software previously installed in each terminal in the targeted set then executes function $F^{-1}$ on the cryptogram $CW^0$ 50 to redetermine the original control word CW that is then supplied to the descrambler.

In this embodiment, particularisation by function F results firstly in partial or total pre-encryption of the control word CW according to methods predefined by the operator, and secondly partial or total encryption of the ECM message containing the cryptogram $(CW^o)^*$ of the pre-encrypted control word.

Note that, as in the second embodiment, the control word transmitted by the smart card to the terminal is in encrypted form. Consequently, and independently of the protection specific to the card/terminal interface, the control word has extra protection on this interface due to the particularisation function F.

In these three embodiments, the access control message transports a description of methods of particularisation comprising data related to:

the choice of the algorithm for encryption of the control word CW and the ECM message, the choice of the key associated with this encryption, the choice of the ECM encryption level.

Figure 4:
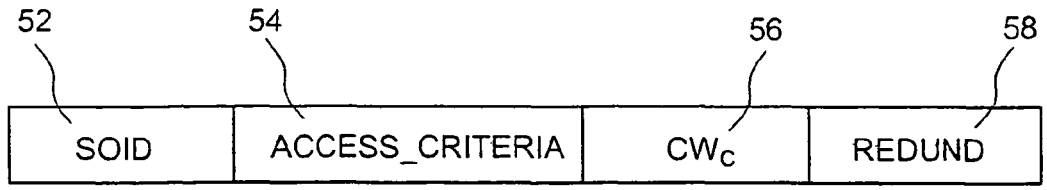

FIGS. 4 and 5 illustrate the content of an ECM message before particularisation and after particularisation respectively.

Before the particularisation function F is applied, the ECM message contains the following functional parameters (FIG. 4):

SOID 52: identification of the cryptographic context applied to the message, in particular specifying the system of keys used in the cryptography applied to the message, ACCESS_CRITERIA 54: list of conditions for access to the scrambled data with which the message is associated, $CW_c$ 56: cryptogram of the control word transported in the ECM message, REDUND 58: cryptographic redundancy of the message.

After application of the particularisation function F, the transformed ECM message comprises the following functional parameters (FIG. 5):

SCRAMBLING_HEADER 60: this parameter describes the encryption methods (particularisation methods) applied to the message. In particular, it identifies the message encryption algorithm, the key used and the delimitation of the portion of message to which the particularisation encryption is applicable.

SOID_MARK 62: identification of the cryptographic context applied to the particularised message, in particular specifying the keys system used in the cryptography applied to the message. This parameter is functionally similar to the SOID parameter in the original message but its syntax is different.

ACCESS_CRITERIA 54: list of conditions for access to scrambled data with which the message is associated, $CW_c$ 56: cryptogram of control words transported in the message REDUND 58: cryptographic redundancy of the message.

Figure 6:
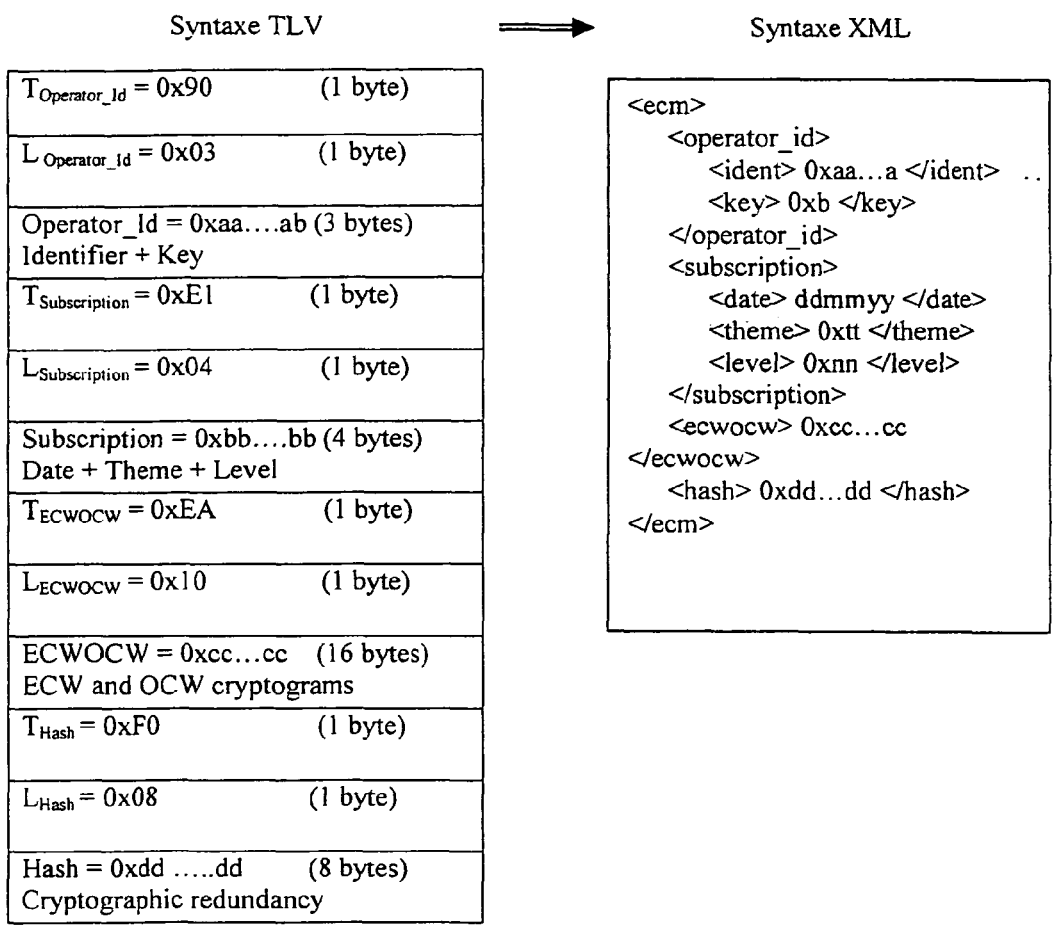
FIG. 6 represents a fourth embodiment of the invention.

FIG. 6 diagrammatically illustrates a fourth embodiment in which the particularisation function F consists of converting the syntax of the ECM message before broadcasting. This conversion is done using methods defined in advance by the operator and transmitted to or known to each terminal in the targeted set to enable the software installed in these terminals to do an inverse conversion using function $F^{-1}$, on reception.

In this embodiment, the syntax conversion is applied to an ECM message in accordance with standard UTE C90-007 << System for conditional access for digital broadcasting systems>>. According to this standard, the ECM message is a sequence, of parameters expressed in T L V (Type Length Value) syntax. The syntax conversion consists of expressing the same semantic content of the message in an XML syntax. The XML file is transmitted to the terminal that makes the inverse syntax conversion to rebuild the start message in the T L V syntax (function $F^{-1}$).

Particularisation of partitioning is the result of the choice of XML syntax rules set up for this conversion.

FIG. 7 diagrammatically illustrates a fifth embodiment in which the particularisation function F consists of making a structural transformation of the ECM message consisting of arranging the T, L and V (Type Length Value) set of parameters present in the ECM message.

In the example shown in FIG. 7, the structural transformation is applied to an ECM message complying with standard UTE C90-007. In this example, the lengths L are grouped together at the beginning of the message, then the codes T of the parameters are grouped together, followed by their values V.

On reception, the terminal reorganises the message in its original structure using function $F^{-1}$, the length of an ECM message always being known, either explicitly or deduced from the transport layer, and the T and L data having fixed lengths (1 byte in this example).

In this embodiment, the particularisation of the partitioning depends on the selected method of reorganising the message structure transmitted to the targeted set of terminals with the ECM message.

FIG. 8a diagrammatically illustrates a sixth embodiment in which the particularisation function F consists of making a breakdown of the ECM message into two partial messages, namely a first partial message ECM1 and a second partial message ECM2 that are then sent simultaneously to the terminal. In this case, two ECM channels are associated with the data scrambled with a signal to identify the ECM1 message and the ECM2 message.

In the example illustrated in FIG. 8b, the breakdown is applied to an ECM message complying with standard UTE C90-007 composed of a sequence of T, L, V parameters. The partitioning is the result of the choice of the breakdown position of the original message and the way in which the two partial messages are sent to the terminal.

On reception, the software previously installed in the targeted terminal executes the inverse function $F^{-1}$ intended to bring together the two partial messages ECM1 and ECM2 to rebuild the original message. This original message is then processed in the normal manner by the smart card to redetermine the control word.

Note that the ECM message may be broken down into more than two partial messages without departing from the scope of the invention.

In one variant of this embodiment of the invention, some partial messages are transmitted in the same multiplex as the scrambled data, while other partial messages are transmitted on different channels, for example such as a two-directional link built up on the return channel.

Each of the particularisation methods described above may be used alone or in combination with one or several other methods described above.

The invention claimed is:

1. Method for broadcasting digital data to a targeted set of reception terminals, in which said data are previously scrambled by a series of control words transmitted in a conditional access entitlement control message (ECM), comprising:

on transmission,
particularising said entitlement control message by means of a reversible function F whose inverse function $F^{-1}$ is executable only in terminals of the targeted set of reception terminals using a particularisation parameter specific to said targeted set of terminals, wherein said function F comprises at least one of the following operations:
fully or partially encrypt the entitlement control message using particularization methods specific to the targeted set of terminals; and
fully or partially pre-encrypt the control words contained in the entitlement control message using particularization methods specific to the target set of terminals; and
breaking down the broadcast period into sequence of crypto CPi,
generating a control word ($CW_i$) for each crypto-period $CP_i$,
fully or partially pre-encrypt said control words,
encrypt the pre-encrypted control words,
calculating an ECM message as a function of the encrypted control words obtained in the previous step, and as a function of at least one criterion controlling access to the scrambled data,
breaking down the ECM message into at least two partial messages,
fully or partially encrypting said ECM message,
broadcasting the encrypted ECM messages to the terminal on reception,
restoring the access control message in its original form only in terminals of the targeted set of reception terminals in which said inverse function $F^{-1}$ is executable, wherein said function F further comprises at least one of the following operations;
reversibly transform the structure of said entitlement control message into a structure that can only be recognised by terminals in the targeted set;
reversibly convert the syntax of said entitlement control message into a syntax that can only be recognised by terminals in the targeted set, using the particularisation methods;
breakdown said entitlement control message into several parts in a manner specific to the targeted set of terminals using the particularisation methods, and transmit said parts separately from each other.

2. Method according to claim 1, wherein the particularisation parameter is either a secret key in a symmetric or asymmetric cryptographic algorithm, or a public and private pair of keys in an asymmetric cryptographic algorithm.

3. Method according to claim 1, in which said inverse function $F^{-1}$ is implemented by a software previously installed in each terminal in the targeted set of reception terminals.

4. Method according to claim 3, wherein said software is resident or downloaded in each terminal of the targeted set of reception terminals.

5. Method according to claim 1, in which said inverse function $F^{-1}$ is implemented by a dedicated circuit previously installed in each terminal of the targeted set of reception terminals.

6. Method according to claim 2, comprising the following steps:
breaking down the broadcast duration into a sequence of crypto-periods CPi,
generating a control word ($Cw_i$) for each crypto-period Cpi,
fully or partially pre-encrypting said control words,
encrypting the pre-encrypted control words obtained in the previous step,
calculating an ECM message as a function of the encrypted control words obtained in the previous step and as a function of at least one criterion controlling access to the scrambled data,
broadcasting the ECM message.

7. Method according to claim 1, comprising the following steps:
breaking down the broadcast duration into a sequence of crypto-periods CPi,
generating a control word ($Cw_i$) for each crypto-period Cpi, fully or partially pre-encrypt said control words,
encrypt the pre-encrypted control words,
calculate an ECM message as a function of the encrypted control words obtained in the previous step and as a function of at least one criterion controlling access to the scrambled data,
fully or partially encrypt said ECM message,
broadcast the ECM message.

8. Method according to claim 1, wherein the digital data represent audiovisual programs.

9. System for broadcasting digital data to a targeted set of reception terminals in which said data are previously scrambled by a series of control words transmitted to said terminals in a conditional access entitlement control message (ECM), characterised in that it comprises transmission means comprising a module adapted to particularize said access control message according to particularisation methods specific to the targeted set of terminals using a reversible function F comprising one of the operations of fully or partially encrypting the entitlement control message and of fully or partially pre-encrypting the control words contained in the entitlement control message, and in that each terminal in the targeted set comprises a module designed to run the inverse function $F^{-1}$ using particularisation methods to determine the original access control message, the system further including one or more modules configured to, on transmission, break down the broadcast period into sequence of crypto CPi, generate a control word ($CW_i$) for each crypto-period $CP_i$, fully or partially pre-encrypt said control words, encrypt the pre-encrypted control words, calculate an ECM message as a function of the encrypted control words obtained in the previous step, and as a function of at least one criterion controlling access to the scrambled data, break down the ECM message into at least two partial messages, fully or partially encrypting said ECM message, and broadcast the encrypted ECM messages to the terminal; the system further including a one or more modules configured to, on reception, restore the access control message in its original form only in terminals of the targeted set of reception terminals in which said inverse function $F^{-1}$ is executable, wherein said function F further comprises at least one of the following operations, reversibly transform the structure of said entitlement control message into a structure that can only be recognised by terminals in the targeted set, reversibly convert the syntax of said entitlement control message into a syntax that can only be recognised by terminals in the targeted set, using the particularisation methods, and break down said entitlement control message into several parts in a manner specific to the targeted set of terminals using the particularisation methods, and transmit said parts separately from each other.

10. Reception terminal that can receive digital data broadcast by a system according to claim 9, characterised in that it comprises a module designed to run the inverse function $F^{-1}$ of said reversible function F to determine said access control message.

11. Reception terminal according to claim 10, comprising software designed to run said inverse function $F^{-1}$ of function F.

12. Reception terminal according to claim 11, wherein said software is resident or downloaded in said terminal.

13. Reception terminal set forth in claim 10, wherein it comprises a dedicated circuit designed to run the inverse function $F^{-1}$.

14. Reception terminal set forth in claim 10, characterised in that said function F comprises at least one of the following operations:
fully or partially encrypt the access control message using particularisation methods specific to the targeted set of terminals;
fully or partially pre-encrypt the control words contained in the access control message using particularisation methods specific to the targeted set of terminals;
reversibly transform the structure of said access control message into a structure that can only be recognised using particularisation methods by terminals in the targeted set;
reversibly convert the syntax of said access control message into a syntax that can only be recognised by terminals in the targeted set using the particularisation methods;
breakdown said access control message into several parts in a manner specific to the targeted set of terminals using the particularisation methods, and transmit said parts separately from each to said terminal in a manner specific to the targeted set of terminals.

15. System for broadcasting digital data according to claim 9 wherein said function F further comprises at least one of the following operations:
reversibly transform the structure of said entitlement control message into a structure that can only be recognized by terminals in the targeted set;
reversibly convert the syntax of said entitlement control message into a syntax that can only be recognized by terminals in the targeted set, using the particularisation methods;
breakdown said entitlement control message into several parts in a manner specific to the targeted set of terminals using the particularisation methods, and transmit said parts separately from each other.

16. Reception terminal that can receive digital data broadcast by a system according to claim 15, characterised in that it comprises a module designed to run the inverse function $F^{-1}$ of said reversible function F to determine said access control message.

* * * * *